United States Patent
Prabhu et al.

(10) Patent No.: US 11,902,748 B2
(45) Date of Patent: *Feb. 13, 2024

(54) EAR-WORN ELECTRONIC HEARING DEVICE INCORPORATING AN ANTENNA WITH CUTOUTS

(71) Applicant: Starkey Laboratories, Inc., Eden Prairie, MN (US)

(72) Inventors: Danita Prabhu, Minneapolis, MN (US); Ryan Owens, Hopkins, MN (US); Aaron Anderson, Mayer, MN (US); Paul Anders Shriner, Hopkins, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/821,059

(22) Filed: Aug. 19, 2022

(65) Prior Publication Data

US 2022/0394399 A1  Dec. 8, 2022

Related U.S. Application Data

(63) Continuation of application No. 17/027,129, filed on Sep. 21, 2020, now Pat. No. 11,425,512, which is a
(Continued)

(51) Int. Cl.
*H04R 25/00* (2006.01)

(52) U.S. Cl.
CPC ........... *H04R 25/554* (2013.01); *H04R 25/65* (2013.01); *H04R 2225/51* (2013.01); *H04R 2225/55* (2013.01)

(58) Field of Classification Search
CPC ........ H04R 25/55; H04R 25/60; H04R 25/65; H04R 25/554; H04R 2225/023; H04R 2225/025; H04R 2225/51
See application file for complete search history.

(56) References Cited

U.S. PATENT DOCUMENTS 5,394,159 A   2/1995   Schneider
5,568,516 A * 10/1996  Strohallen ............ H04B 5/0006
                                                        381/163
(Continued)

FOREIGN PATENT DOCUMENTS

DE  102016207844 A1  6/2017
EP      1326302 A2   7/2003
(Continued)

OTHER PUBLICATIONS

"Log-Periodic Tooth Antennas," accessed from https://www.antenna-theory.com/antennas/wideband/log-periodic.php, accessed on Jan. 17, 2021, 11 pp.
(Continued)

*Primary Examiner* — Suhan Ni
(74) *Attorney, Agent, or Firm* — Shumaker & Sieffert, P.A.

(57) ABSTRACT

An ear-worn electronic hearing device comprises an enclosure configured to be supported by, at, in or on an ear of the wearer. Electronic circuitry is disposed in the enclosure and comprises a wireless transceiver. An antenna is disposed in or on the enclosure and operably coupled to the wireless transceiver. The antenna has a physical size and comprises a plurality of cutouts disposed along a periphery of the antenna. The cutouts are configured to increase an electrical length of the antenna without an increase in the physical size of the antenna. The antenna can comprise at least one interior window having a window periphery. A plurality of window cutouts are disposed along the window periphery. The window cutouts are configured to increase a path length of current distribution along the window periphery.

17 Claims, 9 Drawing Sheets

Related U.S. Application Data continuation of application No. 16/214,901, filed on Dec. 10, 2018, now Pat. No. 10,785,582, and a continuation-in-part of application No. 16/057,177, filed on Aug. 7, 2018, now Pat. No. 10,951,997.

(56) References Cited

U.S. PATENT DOCUMENTS

| | | |
|---|---|---|
| 6,300,914 B1 | 10/2001 | Yang |
| 6,380,895 B1 | 4/2002 | Moren et al. |
| 6,429,819 B1 | 8/2002 | Bishop et al. |
| 6,710,744 B2 | 3/2004 | Morris et al. |
| 6,762,729 B2 | 7/2004 | Egashira |
| 6,762,730 B2 | 7/2004 | Schadler |
| 6,768,468 B2 | 7/2004 | Crouch et al. |
| 7,016,738 B1 | 3/2006 | Karunasiri |
| 7,148,850 B2 | 12/2006 | Puente Baliarda et al. |
| 7,202,822 B2 | 4/2007 | Baliarda et al. |
| 7,342,545 B2 | 3/2008 | Huynh et al. |
| 7,751,902 B1 | 7/2010 | Karunasiri |
| 8,259,026 B2 | 9/2012 | Pulimi et al. |
| 8,405,561 B2 | 3/2013 | Handy et al. |
| 8,406,831 B2 | 3/2013 | Yang et al. |
| 8,565,457 B2 | 10/2013 | Polinske et al. |
| 8,565,891 B2 | 10/2013 | Mumbru et al. |
| 8,605,922 B2 | 12/2013 | Pulimi et al. |
| 8,724,835 B2 | 5/2014 | Kerselaers et al. |
| 9,293,827 B2 | 3/2016 | Park et al. |
| 9,300,367 B2 | 3/2016 | Christensen et al. |
| 9,306,282 B2 | 4/2016 | Komulainen et al. |
| 9,374,650 B2 | 6/2016 | Bauman |
| 9,431,717 B1 | 8/2016 | Lee et al. |
| 9,432,779 B2 | 8/2016 | Kerselaers |
| 9,484,631 B1 | 11/2016 | Napoles et al. |
| 9,502,750 B2 | 11/2016 | Yarga et al. |
| 9,614,294 B2 | 4/2017 | Koga et al. |
| 9,635,475 B2 | 4/2017 | Polinske et al. |
| 9,641,944 B2 | 5/2017 | Johnson et al. |
| 9,666,935 B2 | 5/2017 | Qi et al. |
| 9,706,318 B2 | 7/2017 | So |
| 9,743,198 B2 | 8/2017 | Bergner et al. |
| 9,906,879 B2 | 2/2018 | Prchal et al. |
| 9,980,065 B2 | 5/2018 | Higgins et al. |
| 10,070,232 B2 | 9/2018 | Sø et al. |
| 10,631,109 B2 | 4/2020 | Elghannai et al. |
| 10,785,582 B2 | 9/2020 | Prabhu et al. |
| 10,931,005 B2 | 2/2021 | Shriner et al. |
| 10,951,997 B2 | 3/2021 | Shriner |
| 10,979,828 B2 | 4/2021 | Elghannai et al. |
| 2005/0099341 A1 | 5/2005 | Zhang et al. |
| 2005/0117765 A1 | 6/2005 | Meyer et al. |
| 2006/0093172 A1 | 5/2006 | Ludvigsen et al. |
| 2006/0220966 A1 | 10/2006 | Sarychev et al. |
| 2006/0239483 A1 | 10/2006 | Orts et al. |
| 2008/0267436 A1 | 10/2008 | Kerselaers et al. |
| 2008/0287084 A1 | 11/2008 | Krebs et al. |
| 2009/0219214 A1 | 9/2009 | Parsi et al. |
| 2010/0026775 A1 | 2/2010 | Lai et al. |
| 2010/0158293 A1 | 6/2010 | Polinske et al. |
| 2013/0257676 A1 | 10/2013 | Kerselaers et al. |
| 2013/0343586 A1 | 12/2013 | Kvist et al. |
| 2014/0091974 A1 | 4/2014 | Desclos et al. |
| 2014/0376735 A1 | 12/2014 | Asrani et al. |
| 2015/0042524 A1 | 2/2015 | Kerselaers et al. |
| 2015/0049891 A1 | 2/2015 | Johnson et al. |
| 2015/0118973 A1 | 4/2015 | Montgomery |
| 2015/0201288 A1 | 7/2015 | Bergner et al. |
| 2016/0141757 A1 | 5/2016 | Dobson et al. |
| 2016/0295335 A1 | 10/2016 | Vajha et al. |
| 2016/0330552 A1 | 11/2016 | Flood |
| 2016/0337764 A1 | 11/2016 | Flaig et al. |
| 2016/0366525 A1 | 12/2016 | Bodvarsson |
| 2016/0381471 A1 | 12/2016 | Henriksen |
| 2018/0027343 A1 | 1/2018 | Polinske et al. |
| 2018/0063657 A1 | 3/2018 | Bergner et al. |
| 2018/0069322 A1 | 3/2018 | Vouvakis et al. |
| 2018/0084351 A1 | 3/2018 | Hosadurga et al. |
| 2018/0115055 A1 | 4/2018 | Hosadurga et al. |
| 2018/0124528 A1 | 5/2018 | Polinkse et al. |
| 2018/0138583 A1 | 5/2018 | Yang et al. |
| 2019/0098420 A1 | 3/2019 | Elghannai |
| 2019/0116431 A1 | 4/2019 | Hesselballe |
| 2019/0116433 A1 | 4/2019 | Hesselballe |
| 2019/0116435 A1 | 4/2019 | Hesselballe |

FOREIGN PATENT DOCUMENTS

| | | |
|---|---|---|
| EP | 3313096 A1 | 10/2017 |
| EP | 2680613 B1 | 2/2018 |

OTHER PUBLICATIONS

Berge et al., "Tuning a Dual-Band Bowtie Slot Antenna with Parabolic Radiating Slots for the 900 MHz and 2400 MHz Bands", 6th European Conference on Antennas and Propagation, Mar. 2012, pp. 2376-2379.

Chandra et al., "Miniaturized Antennas For Link Between Binaural Hearing Aids," IEEE, 32nd Annual International Conference of the IEEE EMBS, Buenos Aires, Argentina, Aug. 31-Sep. 4, 2010, pp. 688-691.

Fractus Antennas User Manual Micro Reach Xtend (FROS-SI-N-0-110), Nov. 2017, 12 pages.

Garg et al., "Multi Band Compact Bow-Tie Slot Antenna for WLAN Applications", 2012 Asia-Pacific Symposium on Electromagnetic Compatibility, May 21, 2012, pp. 597-600.

Garje et al., "Single-Fee Triangular Slotted Microstrip Bowtie Antenna for Quad-bands Applications", IOSR Journal of electronics and Communication Engineering, vol. 11, Issue 5, Ver. III, Sep.-Oct. 2016, pp. 22-27.

Huang et al. "Multiple band-stop bow-tie slot antennas for multiband wireless systems", IET Microwaves, Antennas and Propagation., vol. 2, No. 6, Aug. 5, 2008, pp. 588-593.

International Search Report and Written Opinion of International Application No. PCT/US2019/064494, dated Mar. 12, 2020, 15 pp.

Kasemodel et al., "A Planar Dual Linear-Polarized Antenna With integrated Balun," IEEE, IEEE Antennas and Propagation Letters, vol. 9, Aug. 3, 2010, pp. 787-790.

Liu et al. "Metal Strip-Embedded Slot Bowtie Antenna for Wi-Fi and WiMax Applications", Antennas and Propagation Society International Symposium, Jul. 11, 2010, 4 pp.

Mansoul et al., "Multiband reconfigurable Bowtie slot antenna using switchable slot extension for WiFi, WiMAX, and WLAN applications", Microw Opt Technol Lett; 60; 2018 pp. 413-418.

Murata et al., "Broadband Characteristics Analysis of Semicircle-Type Bow-tie Antenna with Hole Slots", Electrical Engineering in Japan, vol. 159, No. 4, 2007, pp. 47-53.

Murugaveni et al., "Design of Slotted Waveguide Antenna for Radar Applications at X-Band", International Journal of Engineering Research & Technology, vol. 3, Issue 11, Nov. 2014, pp. 426-428.

Prosecution History from U.S. Appl. No. 16/214,901, dated Nov. 27, 2019 through May 20, 2020, 41 pp.

Prosecution History from U.S. Appl. No. 17/027,129, dated Dec. 30, 2020 through Apr. 13, 2022, 44 pp.

Quintero et al., "Analysis of Planar UWB Elliptical Dipoles fed by a Coplanar Stripline," IEEE, Proceedings of the 2008 IEEE International Conference on Ultra-Wideband (ICUWB2008), vol. 1, Sep. 10-12, 2008, pp. 113-116.

Yang et al., "Cellular-Phone and Hearing-Aid Interaction: An Antenna Solution," IEEE, IEEE Antennas and Propagation Magazine, vol. 50, No. 3, Jun. 2008, pp. 51-65.

Communication pursuant to Article 94(3) EPC from counterpart European Application No. 19828096.8 dated Jul. 26, 2023, 7 pp.

\* cited by examiner

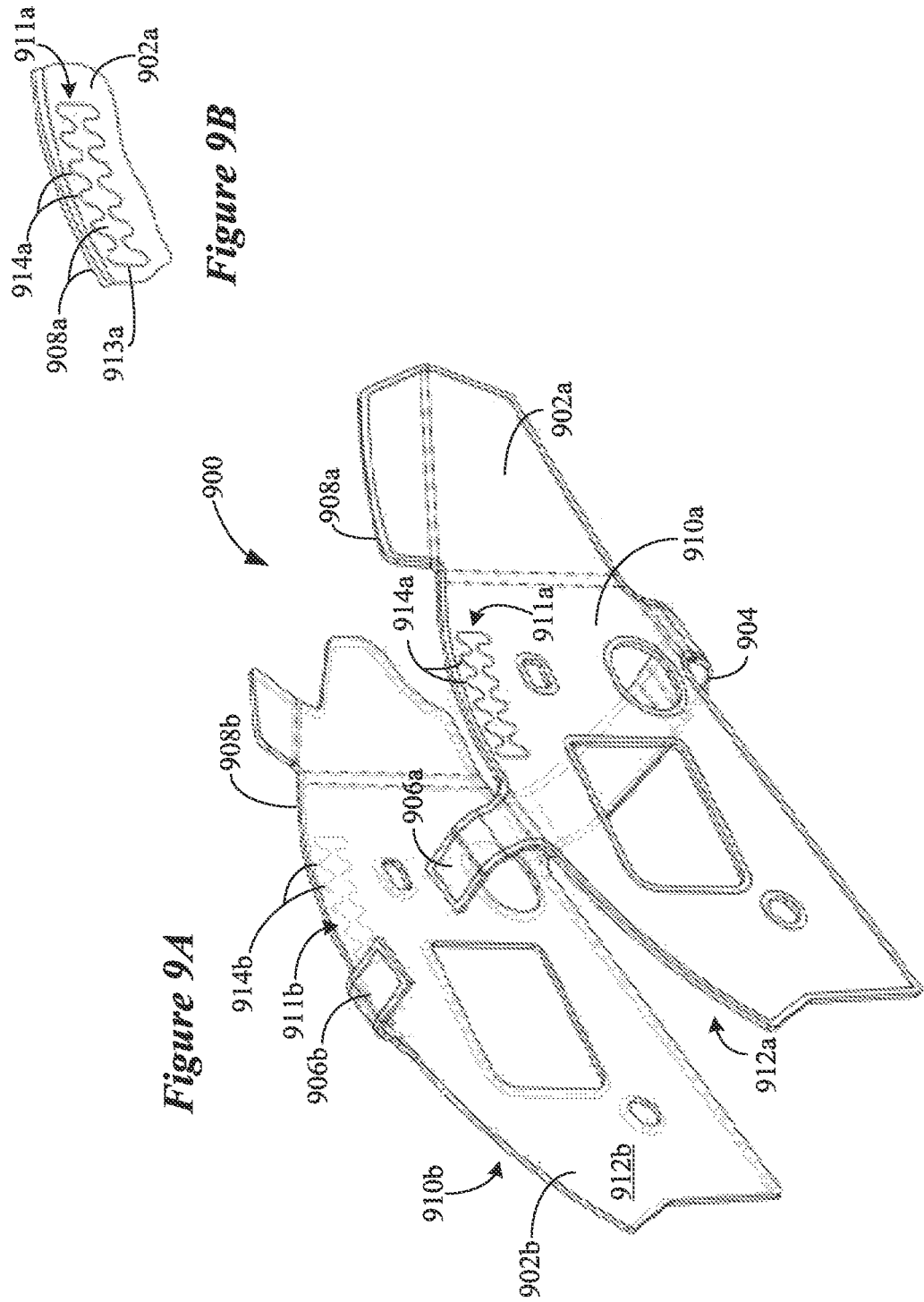

EAR-WORN ELECTRONIC HEARING DEVICE INCORPORATING AN ANTENNA WITH CUTOUTS

This application is a continuation of U.S. patent application Ser. No. 17/027,129, filed Sep. 21, 2020. U.S. patent application Ser. No. 17/027,129 is a continuation of U.S. patent application Ser. No. 16/214,901, filed on Dec. 10, 2018 (now issued as U.S. Pat. No. 10,785,582) and also a continuation-in-part of U.S. patent application Ser. No. 16/057,177, filed Aug. 7, 2018 (now issued as U.S. Pat. No. 10,951,997). The entire contents of each of U.S. patent application Ser. Nos. 17/027,129, 16/214,901, and 16/057,177 are incorporated herein by reference.

TECHNICAL FIELD

This application relates generally to ear-worn electronic hearing devices including hearing aids, personal amplification devices, and other hearables.

BACKGROUND

Hearing devices provide sound for the wearer. Some examples of hearing devices are headsets, hearing aids, speakers, cochlear implants, bone conduction devices, and personal listening devices. For example, hearing aids provide amplification to compensate for hearing loss by transmitting amplified sounds to a wearer's ear drums. Hearing devices may be capable of performing wireless communication with other devices, such as receiving streaming audio from a streaming device via a wireless link. Wireless communication may also be performed for programming the hearing device and transmitting information from the hearing device. For performing such wireless communication, hearing devices can include a wireless transceiver and an antenna.

SUMMARY

Embodiments are directed to an ear-worn electronic hearing device configured to be worn by a wearer. The hearing device comprises an enclosure configured to be supported by, at, in or on an ear of the wearer. Electronic circuitry is disposed in the enclosure and comprises a wireless transceiver. An antenna is disposed in or on the enclosure and operably coupled to the wireless transceiver. The antenna has a physical size and comprises a plurality of cutouts disposed along a periphery of the antenna. The cutouts are configured to increase an electrical length of the antenna without an increase in the physical size of the antenna. In some embodiments, the antenna comprises at least one interior window having a window periphery. A plurality of window cutouts are disposed along the window periphery. The window cutouts are configured to increase a path length of current distribution along the window periphery.

Embodiments are directed to an ear-worn electronic hearing device configured to be worn by a wearer. The hearing device comprises an enclosure configured to be supported by, at, in or on an ear of the wearer. Electronic circuitry is disposed in the enclosure and comprises a wireless transceiver. An antenna is disposed in or on the enclosure and operably coupled to the wireless transceiver. The antenna has a physical size and comprises two antenna elements each comprising electrically conductive material and oriented substantially in opposition to one another. At least some of the electronic circuitry is disposed between the two antenna elements. At least one strap is connected to and between the two antenna elements. A plurality of cutouts are disposed along a periphery of the two antenna elements. The cutouts are configured to increase an electrical length of the antenna without an increase in the physical size of the antenna. In some embodiments, one or both of the two antenna elements comprises at least one interior window having a window periphery. A plurality of window cutouts are disposed along the window periphery. The window cutouts are configured to increase a path length of current distribution along the window periphery.

Embodiments are directed to an ear-worn electronic hearing device configured to be worn by a wearer. The hearing device comprises an enclosure configured to be supported by, at, in or on an ear of the wearer. Electronic circuitry is disposed in the enclosure and comprises a wireless transceiver. An antenna is disposed in or on the enclosure and operably coupled to the wireless transceiver. The antenna has a physical size and comprises at least one interior window having a window periphery. A plurality of window cutouts are disposed along the window periphery. The window cutouts are configured to increase a path length of current distribution along the window periphery and increase an electrical length of the antenna without an increase in the physical size of the antenna. In some embodiments, the antenna comprises two antenna elements each comprising electrically conductive material and oriented substantially in opposition to one another. At least some of the electronic circuitry is disposed between the two antenna elements. At least one strap is connected to and between the two antenna elements. Each of the two antenna elements comprises at least one of the interior windows.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein:

FIG. 9A is a perspective view of an antenna of a hearing device which incorporates one or more interior windows comprising a plurality of window cutouts in accordance with various embodiments;

FIG. 9B is a view of an interior window shown in FIG. 9A comprising a plurality of window cutouts in accordance with various embodiments.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
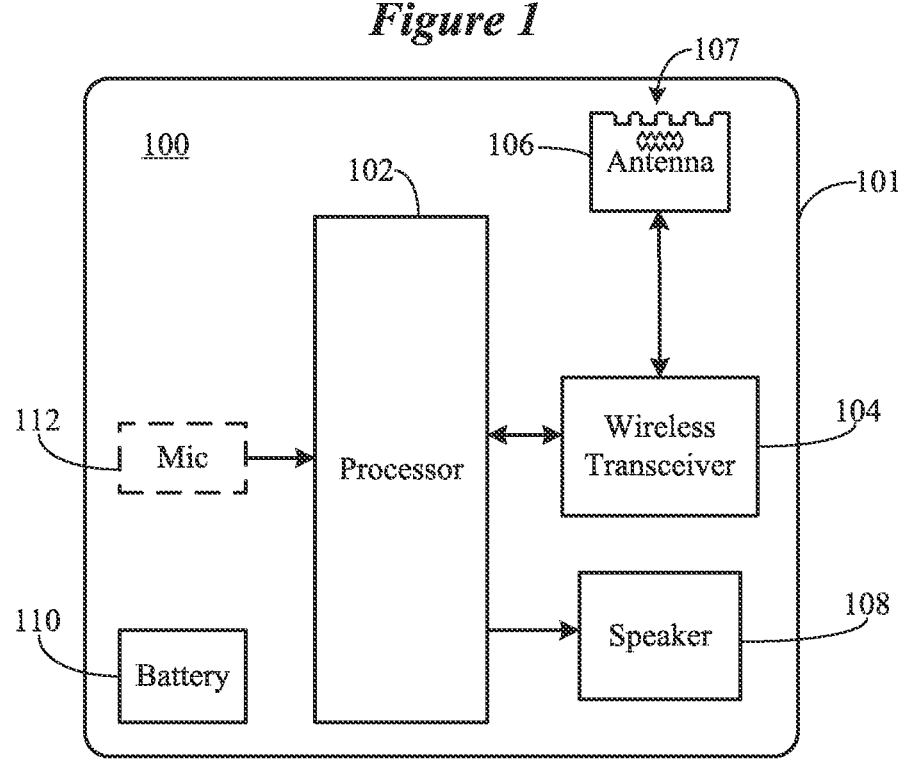
FIG. 1 illustrates various components of a representative hearing device in accordance with various embodiments.

It is understood that the embodiments described herein may be used with any ear-worn electronic hearing device without departing from the scope of this disclosure. The devices depicted in the figures are intended to demonstrate the subject matter, but not in a limited, exhaustive, or exclusive sense. Ear-worn electronic hearing devices (referred to herein as "hearing devices"), such as hearables (e.g., wearable earphones, ear monitors, and earbuds), hearing aids, hearing instruments, and hearing assistance devices, typically include an enclosure, such as a housing or shell, within which internal components are disposed. Typical components of a hearing device can include a processor (e.g., a digital signal processor or DSP), memory circuitry, power management circuitry, one or more communication devices (e.g., a radio, a near-field magnetic induction (NFMI) device), one or more antennas, one or more microphones, and a receiver/speaker, for example. Hearing devices can incorporate a long-range communication device, such as a Bluetooth® transceiver or other type of radio frequency (RF) transceiver. A communication device (e.g., a radio or NFMI device) of a hearing device can be configured to facilitate communication between a left ear device and a right ear device of the hearing device.

Hearing devices of the present disclosure can incorporate an antenna coupled to a high-frequency transceiver, such as a 2.4 GHz radio. The RF transceiver can conform to an IEEE 802.11 (e.g., WiFi®) or Bluetooth® (e.g., BLE, Bluetooth® 4.2 or 5.0) specification, for example. It is understood that hearing devices of the present disclosure can employ other transceivers or radios, such as a 900 MHz radio. Hearing devices of the present disclosure can be configured to receive streaming audio (e.g., digital audio data or files) from an electronic or digital source. Representative electronic/digital sources (e.g., accessory devices) include an assistive listening system, a TV streamer, a radio, a smartphone, a laptop, a cell phone/entertainment device (CPED) or other electronic device that serves as a source of digital audio data or other types of data files. Hearing devices of the present disclosure can be configured to effect bi-directional communication (e.g., wireless communication) of data with an external source, such as a remote server via the Internet or other communication infrastructure. Hearing devices that include a left ear device and a right ear device can be configured to effect bi-directional communication (e.g., wireless communication) therebetween, so as to implement ear-to-ear communication between the left and right ear devices.

The term hearing device of the present disclosure refers to a wide variety of ear-level electronic devices that can aid a person with impaired hearing. The term hearing device also refers to a wide variety of devices that can produce processed sound for persons with normal hearing. Hearing devices of the present disclosure include hearables (e.g., wearable earphones, headphones, earbuds, virtual reality headsets), hearing aids (e.g., hearing instruments), cochlear implants, and bone-conduction devices, for example. Hearing devices include, but are not limited to, behind-the-ear (BTE), in-the-ear (ITE), in-the-canal (IIC), invisible-in-canal (IIC), receiver-in-canal (RIC), receiver-in-the-ear (RITE) or completely-in-the-canal (CIC) type hearing devices or some combination of the above. Throughout this disclosure, reference is made to a "hearing device," which is understood to refer to a system comprising a single left ear device, a single right ear device, or a combination of a left ear device and a right ear device.

Advancements in hearing device technology have resulted in a reduction in the overall size of hearing devices and/or the available internal space due to the desire to incorporate a greater number of components that provide for a greater array of capabilities. For hearing devices that incorporate an RF antenna, a reduction in the physical size of the antenna diminishes the overall performance of the antenna. Several problems arise when designing a small RF antenna, such as one that operates over the 2.4 GHz ISM band. A first problem concerns low feed point impedance. A second problem concerns an inability to meet total radiated power (TRP) requirements due to low radiation efficiency. A third problem concerns a frequency bandwidth that is too narrow to operate over the 2.4 GHz ISM band. Embodiments of the disclosure are directed to an ear-worn electronic hearing device which incorporates an antenna that overcomes the problems listed above and provides for enhanced antenna performance.

A hearing device according to various embodiments comprises an enclosure configured to be supported by, at, in or on an ear of the wearer. Electronic circuitry is disposed in the enclosure and comprises a wireless transceiver. An antenna is disposed in or on the enclosure and operably coupled to the wireless transceiver. The antenna comprises a multiplicity of cutouts along the antenna periphery and/or along a periphery of one or more interior windows that provide for enhanced antenna performance. In some embodiments, the antenna includes a single antenna element provided with cutouts along the antenna periphery and/or along a periphery of one or more interior windows. In other embodiments, the antenna includes two or more antenna elements each provided with cutouts along the antenna periphery and/or along a periphery of one or more interior windows. Incorporation of antenna cutouts in accordance with the present disclosure provides for a hearing device antenna with improved radiation efficiency as well as an increased impedance bandwidth. Incorporation of antenna cutouts in accordance with the present disclosure serves to increase the electrical length of the antenna without increasing the physical size of the antenna, which is particularly advantageous for small hearing devices.

FIG. 1 illustrates various components of a representative hearing device in accordance with various embodiments. FIG. 1 illustrates a hearing device 100 configured to be supported at, by, in or on a left ear or a right ear of a wearer.

Typically, two hearing devices 100 (left and right) are worn by a wearer, both of which include the components shown in FIG. 1. It is understood that left and right hearing devices can include different functional components. The hearing device 100 can be representative of any of the hearing devices disclosed herein.

The hearing device 100 includes an enclosure 101 configured for placement, for example, over or on the ear, entirely or partially within the external ear canal (e.g., between the pinna and ear drum) or behind the ear. Disposed within the enclosure 101 is a processor 102 which incorporates or is coupled to memory circuitry. The processor 102 can include or be implemented as a multi-core processor, a digital signal processor (DSP), an audio processor or a combination of these processors. For example, the processor 102 may be implemented in a variety of different ways, such as with a mixture of discrete analog and digital components that include a processor configured to execute programmed instructions contained in a processor-readable storage medium (e.g., solid-state memory, Flash).

The processor 102 is coupled to a wireless transceiver 104 (also referred to herein as a radio), such as a BLE transceiver. The wireless transceiver 104 is operably coupled to an antenna 106 configured for transmitting and receiving radio signals. The antenna 106, according to various embodiments, includes a plurality of antenna cutouts 107 configured to enhance antenna performance. As will be described in greater detail, the cutouts 107 are configured to increase the electrical length of the antenna without an increase in the physical size of the antenna.

Figure 2:
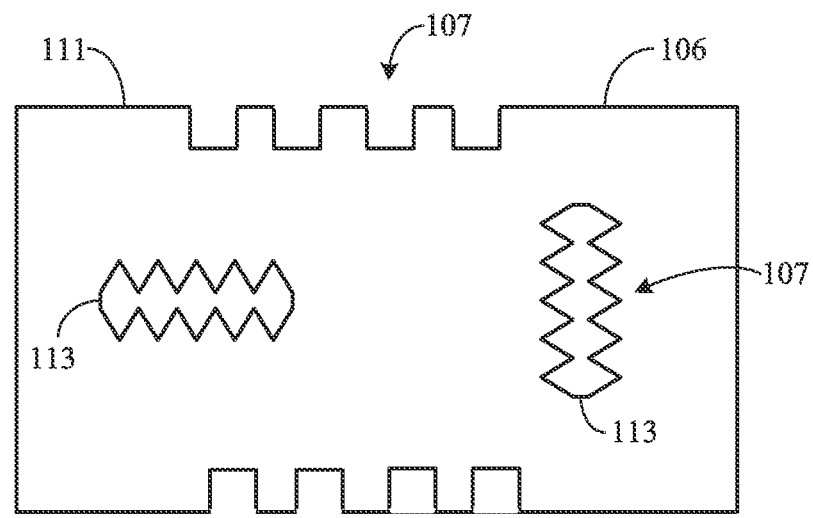
FIG. 2 shows cutouts provided along a periphery of the antenna and/or along the periphery of one or more interior windows of the antenna in accordance with various embodiments.

As is shown in FIG. 2, cutouts 107 can be provided along a periphery 111 of the antenna 106 according to various embodiments. In some embodiments, cutouts 107 can be provided along the periphery of one or more interior windows 113. In other embodiments, cutouts 107 can be provided along the antenna periphery 111 and along the periphery of one or more interior windows 113. The antenna 106 can be any type of antenna suitable for incorporation in the hearing device 100, several representative examples of which are described hereinbelow.

The wireless transceiver 104 and antenna 106 can be configured to enable ear-to-ear communication between two hearing devices 100, as well as communications with an external device (e.g., a smartphone or a digital music player). A battery 110 or other power source (rechargeable or conventional) is provided within the enclosure 101 and is configured to provide power to the various components of the hearing device 100. A speaker or receiver 108 is coupled to an amplifier (not shown) and the processor 102. The speaker or receiver 108 is configured to generate sound which is communicated to the wearer's ear drum.

In some embodiments, the hearing device 100 includes a microphone 112 mounted on or inside the enclosure 101. The microphone 112 may be a single microphone or multiple microphones, such as a microphone array. The microphone 112 can be coupled to a preamplifier (not shown), the output of which is coupled to the processor 102. The microphone 112 receives sound waves from the environment and converts the sound into an input signal. The input signal is amplified by the preamplifier and sampled and digitized by an analog-to-digital converter of the processor 102, resulting in a digitized input signal. In some embodiments (e.g., hearing aids), the processor 102 (e.g., DSP circuitry) is configured to process the digitized input signal into an output signal in a manner that compensates for the wearer's hearing loss. When receiving an audio signal from an external source, the wireless transceiver 104 may produce a second input signal for the DSP circuitry of the processor 102 that may be combined with the input signal produced by the microphone 112 or used in place thereof. In other embodiments, (e.g., hearables), the processor 102 can be configured to process the digitized input signal into an output signal in a manner that is tailored or optimized for the wearer (e.g., based on wearer preferences). The output signal is then passed to an audio output stage that drives the speaker or receiver 108, which converts the output signal into an audio output.

Some embodiments are directed to a custom hearing aid, such as an IIC, CIC, or TIC hearing aid, for example. For example, some embodiments are directed to a custom hearing aid which includes a wireless transceiver and an antenna arrangement configured to operate in the 2.4 GHz ISM frequency band (e.g., a Bluetooth® band). Creating a robust antenna arrangement for a 2.4 GHz custom hearing aid represents a significant engineering challenge. A custom hearing aid is severely limited in space, and the antenna arrangement is in close proximity to other electrical components, both of which impacts antenna performance. Because the human body is very lossy and a custom hearing aid is positioned within the ear canal, a high performance antenna arrangement is particularly desirable. The antenna 106 comprising cutouts 107 advantageously increases the electrical length of the antenna 106 without an increase in the size of the antenna 106, which is particularly important for custom hearing aids and other small hearing devices.

Figure 3:
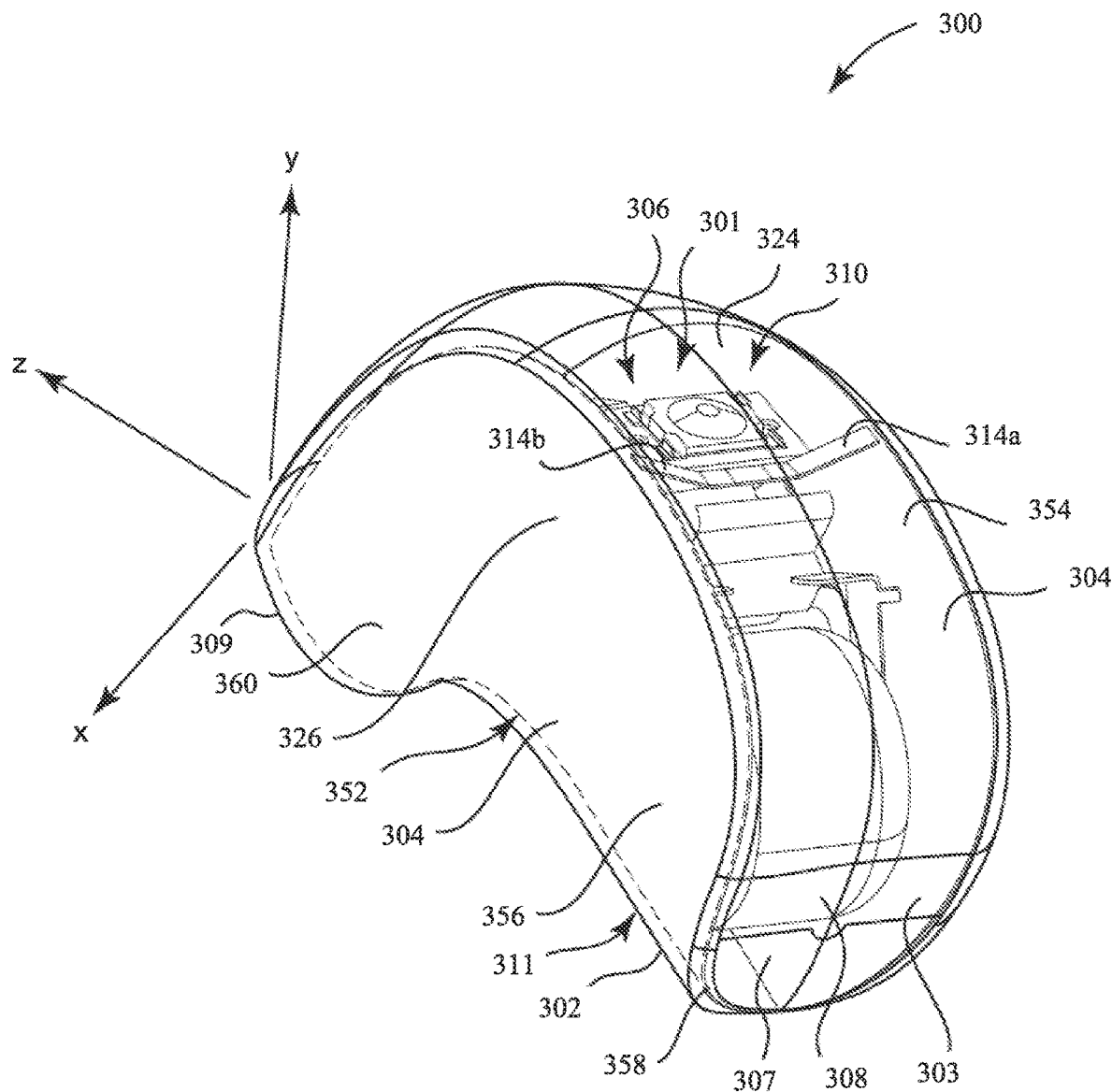
FIG. 3 illustrates a hearing device configured to incorporate an antenna with cutouts in accordance with various embodiments.

FIG. 3 illustrates a hearing device configured to incorporate an antenna with cutouts in accordance with various embodiments. In the embodiment shown in FIG. 3, the hearing device 300 is of a behind-the-ear design. The hearing device 300 includes an enclosure 302 in the form of a housing or shell, which includes a first end 307 and an opposing second end 309. The enclosure 302 also includes a bottom 311, a removable top or cap (removed in FIG. 3) opposing the bottom 311, and opposing sides 324 and 326, all of which extend between the first and second ends 307 and 309. A battery 308 is shown positioned proximate the first end 307. The first end 307 can be hingedly connected to the enclosure 302 or otherwise configured to move between closed and open positions for installing and removing the battery 308. A spine 310 extends longitudinally within the enclosure 302 between the battery 308 and the second end 309. The spine 310 is a structure inside the enclosure 302 that supports a flexible circuit substrate and electronics 306 of the hearing device 300. The spine 310 includes supports or struts that are connected to interior surfaces 303 of the enclosure 302 and positionally fix the spine 310 within the enclosure 302.

In the embodiment shown in FIG. 3, an antenna 304 (partially indicated by a dashed line) is disposed within or on the enclosure 302 and has a shape that generally conforms to a shape of the enclosure 302. As such, the shape of the antenna 304 generally follows the shape of the enclosure wall. Although not shown in FIG. 3, the antenna 304 can include any of the peripheral cutouts and/or interior window cutouts described hereinbelow. The antenna 304 can have a variety of configurations, examples of which are also described hereinbelow. For purposes of illustration and not of limitation, antenna 304 will be described as a folded antenna. In other embodiments, antenna 304 can be a bowtie or other type of antenna.

In some embodiments, the antenna 304 is a folded antenna having the general shape of a taco or saddle. The folded antenna 304 can have a generally U-shaped cross-section, for example. The folded antenna 304 can be a substantially solid, folded structure that extends longitudinally along interior surfaces 303 of the enclosure 302. The folded antenna 304 has a first end 358, a second and 360, and a belly 352 that extends axially between the first and second ends 358 and 360. The folded antenna 304 includes opposing first and second sides 354 and 356 that extend from the belly 352 at an angle (e.g., an acute angle). Depending on how the folded antenna 304 is oriented within the enclosure 302, the belly 352 can define a bottom or a top of the antenna 304. In the embodiment shown in FIG. 3, for example, the belly 352 defines a bottom of the antenna 304. The opposing sides 354, 356 of the folded antenna 304 form an elongated gap 301 that faces the top of the enclosure 302. The elongated gap 301 serves as the effective radiator of the folded antenna 304. Using an electrical description, the folded antenna 304 can be described as a unique type of electrically small loop antenna, symmetric folded patch antenna, magnetic dipole antenna, or differentially fed planar inverted F antenna or PIFA.

The folded antenna 304 is positioned in close proximity to walls of the enclosure 302 so that the folded antenna 304 encompasses at least part of the spine 310 and at least some of the electronics 306 of the hearing device 300. As shown, the folded antenna 304 encompasses the spine 310, all of the electronics 306, and the battery 308 of the hearing device 300. The components of the enclosure 302 considered encompassed by the folded antenna 304 are those components captured between the opposing sides 354 and 356 of the antenna 304. In an electrical context, components of the enclosure 302 considered encompassed by the folded antenna 304 are those components (e.g., spine 310 and/or electronics 306) that can effectively become part of the matching network that serves to tune the antenna 304. Antenna feed lines 314a and 314b electrically couple opposing sides 354 and 356 of the folded antenna 304 to a radio of the electronics 306.

In some embodiments, the folded antenna 304 constitutes a stamped metal structure with cutouts having a shape and location described hereinbelow. In other embodiments, the folded antenna 304 constitutes a metal plated structure with cutouts having a shape and location described hereinbelow. For example, the antenna 304 can be plated inside and/or outside of the enclosure 302, essentially forming a solid metalized shell. According to other embodiments, the folded antenna 304 can be a discontinuous structure comprising a multiplicity of connected antenna portions. For example, the folded antenna 304 can be split into several parts with tight coupling between each part to make the antenna 304 more manufacturable, for example, using flex printed circuit board technology. For example, the folded antenna 304 can comprise a conductive layer on a flexible printed circuit board. By way of further example, the folded antenna 304 can be a laser direct structuring (LDS) structure. The folded antenna 304 can have dimensions, features, and functionality disclosed in commonly-owned U.S. Patent Publication No. 2018/0138583, which is incorporated herein by reference.

According to some embodiments, the antenna 304 can be implemented as a bowtie-type antenna. Various embodiments of a bowtie antenna 304 incorporating cutouts according to the present disclosure are shown in FIGS. 4-9B. A bowtie antenna can be considered a type of dipole broadband antenna. In general, a bowtie antenna can include two roughly parallel conductive plates that can be fed at a gap between the two conductive plates. Examples of bowtie antennas that may be used in hearing devices of the present disclosure are described in U.S. patent application Ser. No. 14/706,173, entitled "HEARING AID BOWTIE ANTENNA OPTIMIZED FOR EAR TO EAR COMMUNICATIONS," filed on May 7, 2015, U.S. patent applicant Ser. No. 15/331,077, entitled "HEARING DEVICE WITH BOWTIE ANTENNA OPTIMIZED FOR SPECIFIC BAND," filed on Oct. 21, 2016, and in U.S. patent application Ser. No. 15/718,760, entitled "EAR-WORN ELECTRONIC DEVICE INCORPORATING ANTENNA WITH REACTIVELY LOADED NETWORK CIRCUIT," filed Sep. 28, 2017, which are commonly assigned to Starkey Laboratories, Inc., and incorporated herein by reference in their entirety. It is understood that antennas other than bowtie and folded antennas can be implemented to incorporate peripheral cutouts and/or interior window cutouts in accordance with embodiments of the disclosure. Representative antennas include dipoles, monopoles, dipoles with capacitive-hats, monopoles with capacitive-hats, folded dipoles or monopoles, meandered dipoles or monopoles, loop antennas, Yagi-Uda antennas, log-periodic antennas, inverted-F antennas (IFA), planar inverted-F antennas (PIFA), patch antennas, and spiral antennas.

Figure 4:
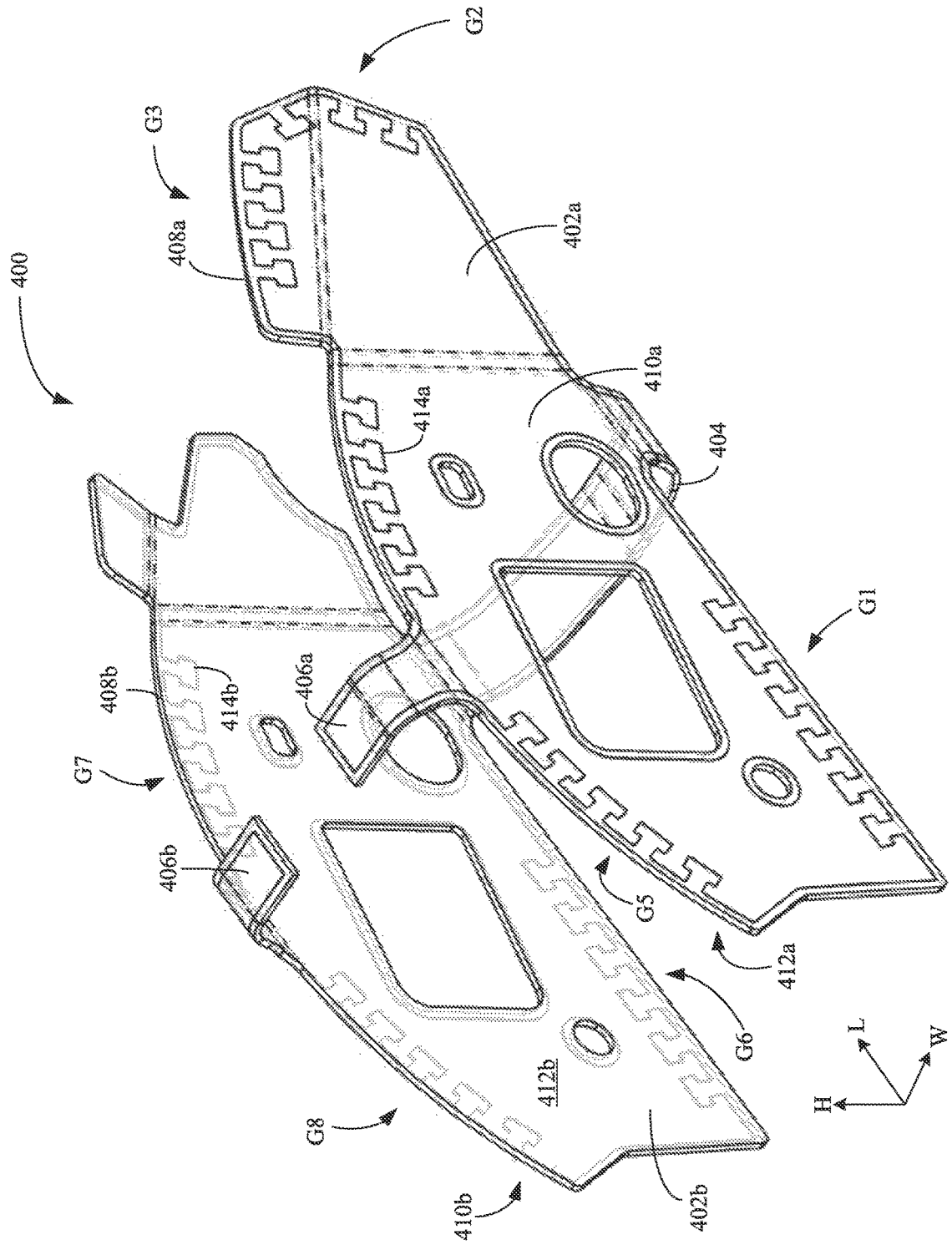
FIG. 4 is a perspective view of an antenna of a hearing device which incorporates a plurality of cutouts disposed along a periphery of the antenna in accordance with various embodiments.

FIG. 4 is a perspective view of an antenna of a hearing device which incorporates a plurality of cutouts disposed along a periphery of the antenna in accordance with various embodiments. The antenna 400 shown in FIG. 4 has a bowtie configuration and includes two antenna elements 402a, 402b. The two antenna elements 402a, 402b comprise electrically conductive material 410a, 410b oriented substantially in opposition to one another. In the embodiment shown in FIG. 4, the electrically conductive material 410a, 410b (e.g., copper) is disposed on a substrate 412a, 412b. The substrate 412a, 412b can be a flexible substrate (e.g., polyamide) or a rigid substrate (FR-4). When installed within an enclosure of a hearing device, at least some of the electronic circuitry of the hearing device is disposed between the two antenna elements 402a, 402b (see, e.g., FIG. 3). Each of the antenna elements 402a, 402b includes a feed line 406a, 406b, which are electrically coupled to a wireless transceiver disposed within the enclosure of the hearing device.

In some embodiments, the antenna 400 includes at least one electrically conductive strap 404 connected to and between the two antenna elements 402a, 402b. The strap 404 can include a reactive component (e.g., lumped or discrete component) mounted to or mechanically integrated into the strap 404. The reactive component may include a capacitor, an inductor, a chip antenna, or any combination of these components, which can define a reactively loaded network circuit.

Each of the antenna elements 402a, 402b has a periphery 408a, 408b. The antenna elements 402a, 402b include a plurality of cutouts 414a, 414b disposed along the periphery 408a, 408b of the antenna elements 402a, 402b. In the embodiment shown in FIG. 4, each of the cutouts 414a, 414b defines a void in the electrically conductive material 410a, 410b with the substrate 412a, 412b extending across the void. In other embodiments, the cutouts 414a, 414b are provided in both the electrically conductive material 410a, 410b and the substrate 412a, 412b. As shown in FIG. 4, the antenna elements 402a, 402b may include a number of internal windows which are included to accommodate mechanical and/or electrical components situated within the enclosure of the hearing device.

In some embodiments, the cutouts 414a, 414b can be arranged as a plurality of cutout groups each comprising a repeating pattern of cutouts. For example, antenna element 402a is shown to include five groups (G1-G5) of cutouts 414a along the periphery 408a of antenna element 402a. Antenna element 402b is shown to include three groups (G6-G8) of cutouts 414b along the periphery 408b of antenna element 402b. The number of cutouts in each cutout group can vary, such as between about 2 and 10 cutouts. The number of cutouts per cutout group can be the same or different. The number of cutout groups per individual antenna element 402a, 402b can be the same or different. In the embodiment shown in FIG. 4, for example, the number of cutout groups of antenna elements 402a and 402b differ from one another, as do the total number of cutouts included along the periphery 408a, 408b of the two antenna elements 402a, 402b.

The antenna 400 has a physical size, which can be defined by length (L), height (H), and width (W) dimensions. As was discussed previously, the physical size of the antenna 400 is limited by the available space within the enclosure of a particular ear-worn electronic hearing device. A current challenge faced by developers of small sized wireless hearing devices (e.g., a 2.4 GHz wireless device) is the need to reduce the size of the hearing device, which necessitates a reduction in the size of the antenna as well. Reducing the size of the antenna, however, diminishes the overall performance of the antenna. Advantageously, the cutouts 414a, 414b provided along the periphery 408a, 408b of antenna elements 402a, 402b increases the path of the current distribution along the periphery 408a, 408b of the antenna elements 402a, 402b. This increase in the path of the current distribution along the periphery 408a, 408b of the antenna elements 402a, 402b increases the effective electrical length of the antenna 400 without having to increase the physical size (e.g., L, H, and/or W) of the antenna 400.

It can be appreciated that inclusion of a multiplicity of cutouts 414a, 414b along the periphery 408a, 408b of antenna elements 402a, 402b reduces the surface area of the antenna 400 relative to the antenna 400 devoid of the cutouts 414a, 414b. Advantageously, the cutouts 414a, 414b are configured to increase a radiation efficiency of antenna 400 notwithstanding the reduction in antenna surface area due to the presence of the cutouts 414a, 414b. Other improvements in antenna performance can be achieved by inclusion of a multiplicity of cutouts 414a, 414b along the periphery 408a, 408b of antenna elements 402a, 402b. For example, the cutouts 414a, 414b can be configured to provide for an increase in impedance bandwidth of the antenna 400 relative to the antenna 400 devoid of the cutouts 414a, 414b. The cutouts 414a, 414b can be configured to modify one or both of an impedance and a resonance frequency of the antenna 400. The size, shape, number, and location of cutouts and cutout groups can be chosen to achieve one or more of a desired radiation efficiency, impedance bandwidth, impedance, and resonance frequency of the antenna 400.

Although the antenna 400 is shown as including two antenna elements 402a, 402b in the representative embodiment of FIG. 4, it is understood that antenna 400 can include a single antenna element or more than two antenna elements. Also, it is understood that antenna 400 need not have a bowtie configuration, and can be configured according to any of the representative antennas disclosed elsewhere herein.

Figure 5:
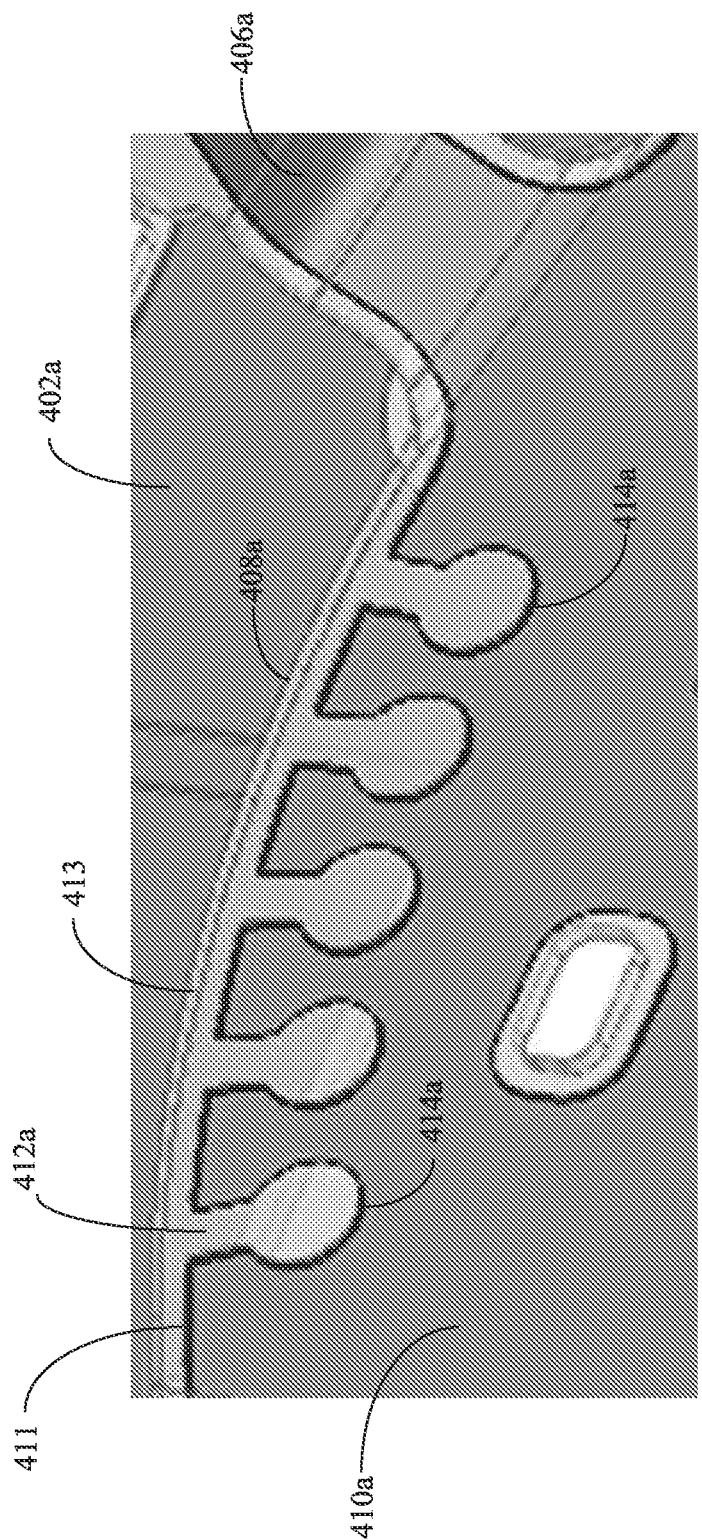
FIG. 5 is a view of a portion of an antenna having a periphery which includes a plurality of cutouts in accordance with various embodiments.

FIG. 5 is a view of a portion of antenna element 402a having a periphery 408a which includes a plurality of cutouts 414a in accordance with various embodiments. In FIG. 5, the cutouts 414a have a shape differing from that of the cutouts 414a shown in FIG. 4. Examples of other cutout shapes are described hereinbelow. FIG. 5 shows that cutouts 414a are provided along a periphery 411 of the electrically conductive material 410a of antenna element 402a. Each of the cutouts 414a defines a void in the electrically conductive material 410a, with the substrate 412a extending across the void. In some embodiments, the periphery 413 of the substrate 412a can be notched, shaped or molded so as to include cutouts that generally conform to the shape of cutouts 414a in the electrically conductive material 410a.

Referring again to FIG. 4, and in accordance with some embodiments, the substrates 412a, 412b can comprise plastic plates that support one or more metallization layers, such as by use of a Laser Direct Structuring (LSD) technique. In other embodiments, the substrates 412a, 412b and electrically conductive material 410A, 410b are components of a flex circuit antenna. According to further embodiments, an antenna having a periphery comprising a plurality of cutouts can comprise one or more stamped metal plates. For example, and with reference to the embodiment shown in FIG. 6, a stamped metal antenna 600 includes two antenna elements 602a, 602b each of which includes a periphery 611a, 611b comprising a plurality of cutouts 608a, 608b. A conductive strap 604 of a type previously described can be connected to and between the two antenna elements 602a, 602b.

Figure 7A:
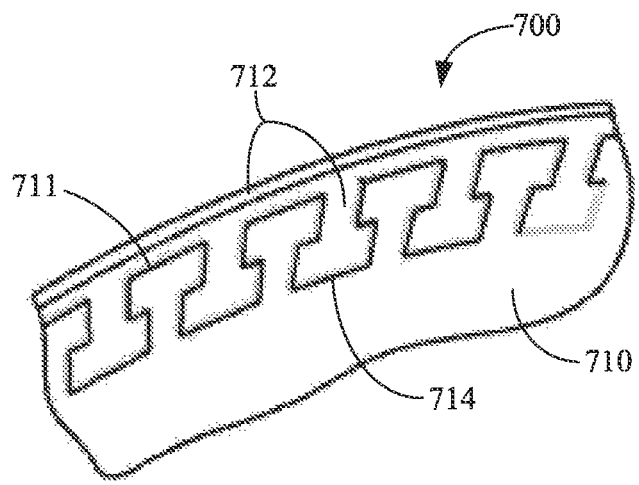
FIGS. 7A-7C show a portion of an antenna which includes differently shaped polygonal cutouts disposed along a periphery of the antenna in accordance with various embodiments.
Figure 7B:
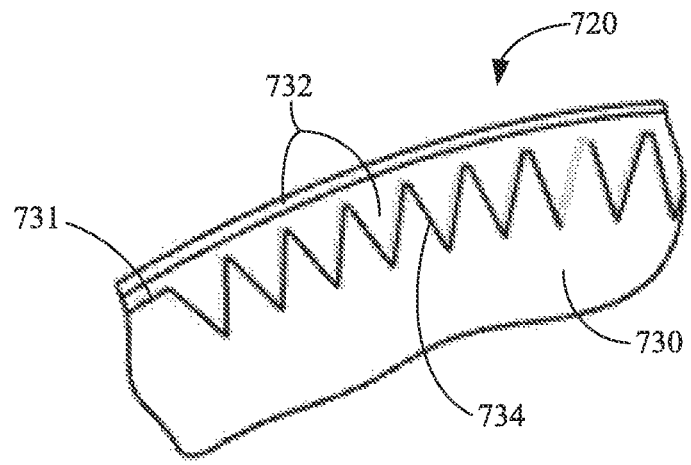
Figure 7C:
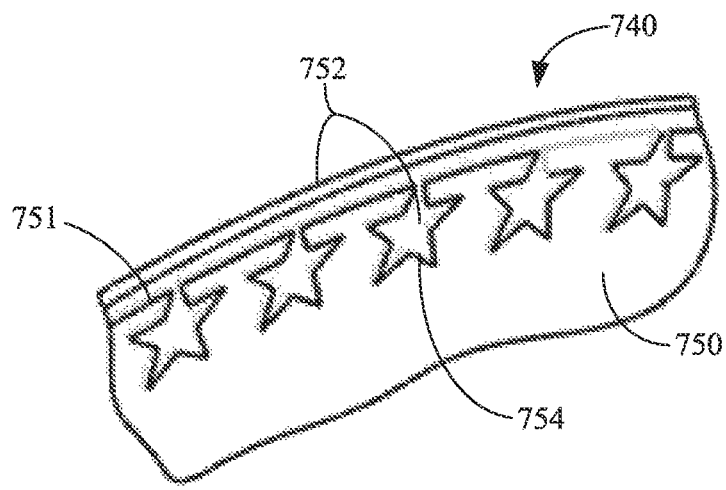
Figure 8A:
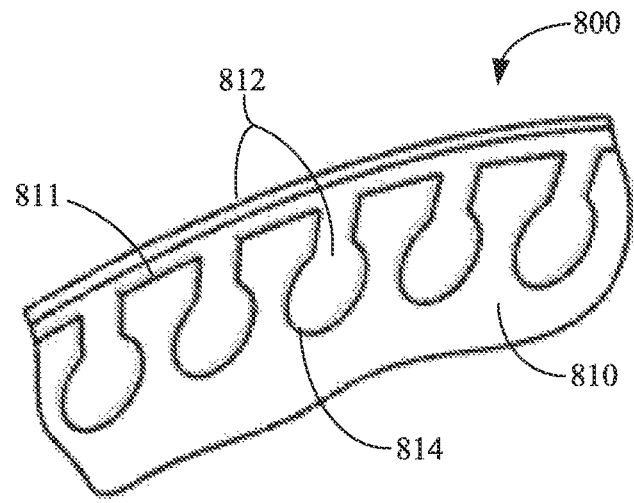
FIGS. 8A and 8B show a portion of an antenna which includes differently shaped curved or curvilinear cutouts disposed along a periphery of the antenna in accordance with various embodiments.
Figure 8B:
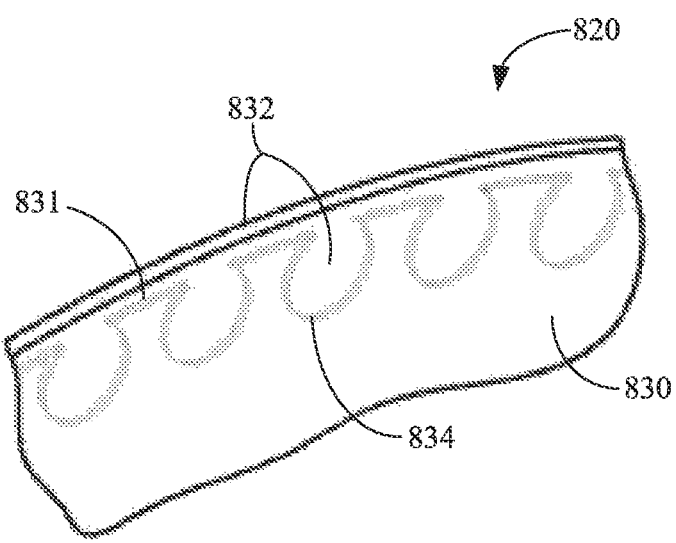

As was previously discussed, the cutouts provided along the periphery of an antenna of an ear-worn electronic hearing device can have a variety of shapes. The cutouts can have a polygonal shape, a generally curved or curvilinear shape, or a combination of polygonal and curved/curvilinear shapes. The cutouts of an antenna can have the same general shape or a combination of different shapes. FIGS. 7A-7C show cutouts having a polygonal shape according to some embodiments. FIGS. 8A and 8B show cutouts having a curved or curvilinear shape according to other embodiments. It is understood that cutouts of an antenna can include a combination of polygonal and curved/curvilinear shapes, such as any combination of shapes shown in FIGS. 7A-7C, 8A, and 8B.

FIG. 7A shows a portion of an antenna 700 which includes electrically conductive material 710 having a periphery 711 according to various embodiments. The periphery 711 includes a plurality of cutouts 714 having a hammer shape. In some embodiments, the electrically conductive material 710 is disposed on a substrate 712 (flexible or rigid), and the cutouts 714 can define voids in the electrically conductive material 710 with the substrate 712 extending across the voids.

FIG. 7B shows a portion of an antenna 720 which includes electrically conductive material 730 having a periphery 731 in accordance with various embodiments. The periphery 731 includes a plurality of cutouts 734 having a sawtooth shape. In some embodiments, the electrically conductive material 730 can be disposed on a substrate 732 (flexible or rigid), and the cutouts 734 can define voids in the electrically conductive material 730 with the substrate 732 extending across the voids.

FIG. 7C shows a portion of an antenna 740 which includes electrically conductive material 750 having a periphery 751 in accordance with various embodiments. The periphery 751 includes a plurality of cutouts 754 having a star shape. In some embodiments, the electrically conductive material 750 can be disposed on a substrate 752 (flexible or rigid), and the cutouts 754 can define voids in the electrically conductive material 750 with the substrate 752 extending across the voids.

FIG. 8A shows a portion of an antenna 800 which includes electrically conductive material 810 having a periphery 811 in accordance with various embodiments. The periphery 811 includes a plurality of cutouts 814 having a lollipop shape. In some embodiments, the electrically conductive material 810 can be disposed on a substrate 812 (flexible or rigid), and the cutouts 814 can define voids in the electrically conductive material 810 with the substrate 812 extending across the voids.

FIG. 8B shows a portion of an antenna 820 which includes electrically conductive material 830 having a periphery 831 in accordance with various embodiments. The periphery 831 includes a plurality of cutouts 834 having a circular shape. In some embodiments, the electrically conductive material 830 can be disposed on a substrate 832 (flexible or rigid), and the cutouts 834 can define voids in the electrically conductive material 830 with the substrate 832 extending across the voids.

FIG. 9A is a perspective view of an antenna of a hearing device which incorporates one or more interior windows comprising a plurality of window cutouts in accordance with various embodiments. The antenna 900 shown in FIG. 9A has a bowtie configuration and includes two antenna elements 902a, 902b. The two antenna elements 902a, 902b comprise electrically conductive material 910a, 910b oriented substantially in opposition to one another. In the embodiment shown in FIG. 9A, the electrically conductive material 910a, 910b (e.g., copper) is disposed on a substrate 912a, 912b, which can be a flexible substrate (e.g., polyamide) or a rigid substrate (FR-4). When installed within an enclosure of a hearing device, at least some of the electronic circuitry of the hearing device is disposed between the two antenna elements 902a, 902b (see, e.g., FIG. 3). Each of the antenna elements 902a, 902b includes a feed line 906a, 906b, which are electrically coupled to a wireless transceiver disposed within the enclosure of the hearing device. As in the case of the embodiments shown in FIGS. 4 and 6, antenna 900 can include at least one electrically conductive strap 904 of a type previously described connected to and between the two antenna elements 902a, 902b.

The two antenna elements 902a, 902b include at least one interior window 911a, 911b each having a window periphery. A plurality of window cutouts are disposed along the window periphery of interior windows 911a, 911b. FIG. 9B shows additional details of interior window 911a provided in antenna element 902a. Interior window 911a includes a plurality of window cutouts 914a disposed along the window periphery 913a of interior window 911a. In the embodiment of FIG. 9A, interior windows 911a, 911b are positioned near feed lines 906a, 906b and spaced away from the periphery 908a, 908b of antenna elements 902a, 902b. In some embodiments, two, three or more of the interior windows 911a, 911b comprising window cutouts 914a, 914b can be provided within the interior region of the two antenna elements 902a, 902b. The window cutouts 914a, 914b are configured to increase a path length of the current distribution along the window periphery and increase an electrical length of antenna 900 without an increase in the physical size of antenna 900.

Figure 6:
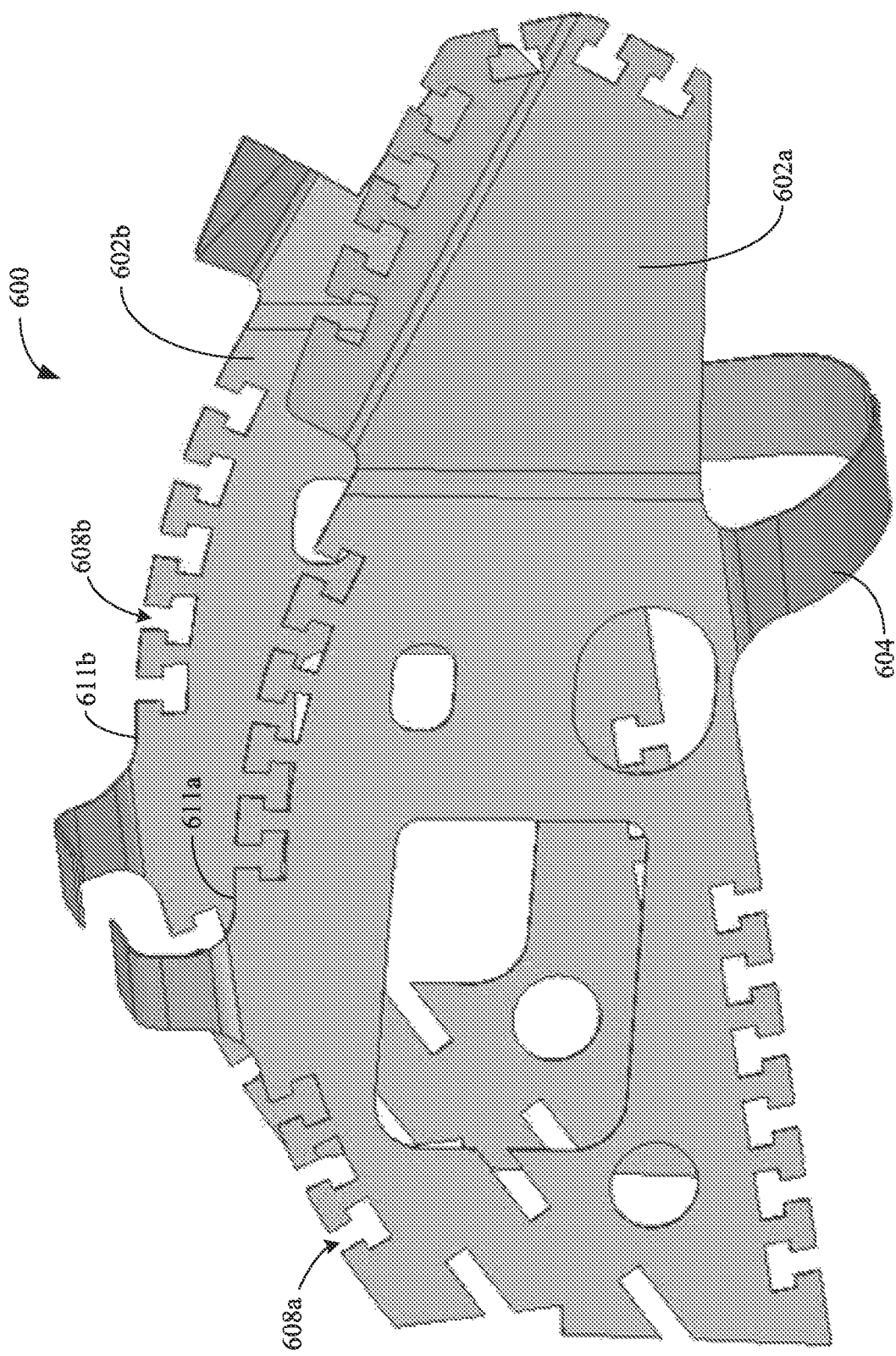
FIG. 6 is a perspective view of an antenna of a hearing device which incorporates a plurality of cutouts disposed along a periphery of the antenna in accordance with various embodiments.

In some embodiments, each of the antenna elements 902a, 902b comprises a plurality of cutouts disposed along a periphery 908a, 908b of the antenna elements 902a, 902b as shown in FIGS. 4 and 6 in combination with one or more interior windows 911a, 911b with window cutouts 914a, 914b as shown in FIGS. 9A and 9B.

It is understood that, in other embodiments, antenna 900 can include a single antenna element or more than two antenna elements. Also, it is understood that antenna 900 need not have a bowtie configuration, and can be configured according to any of the representative antennas disclosed elsewhere herein.

Figure 10:
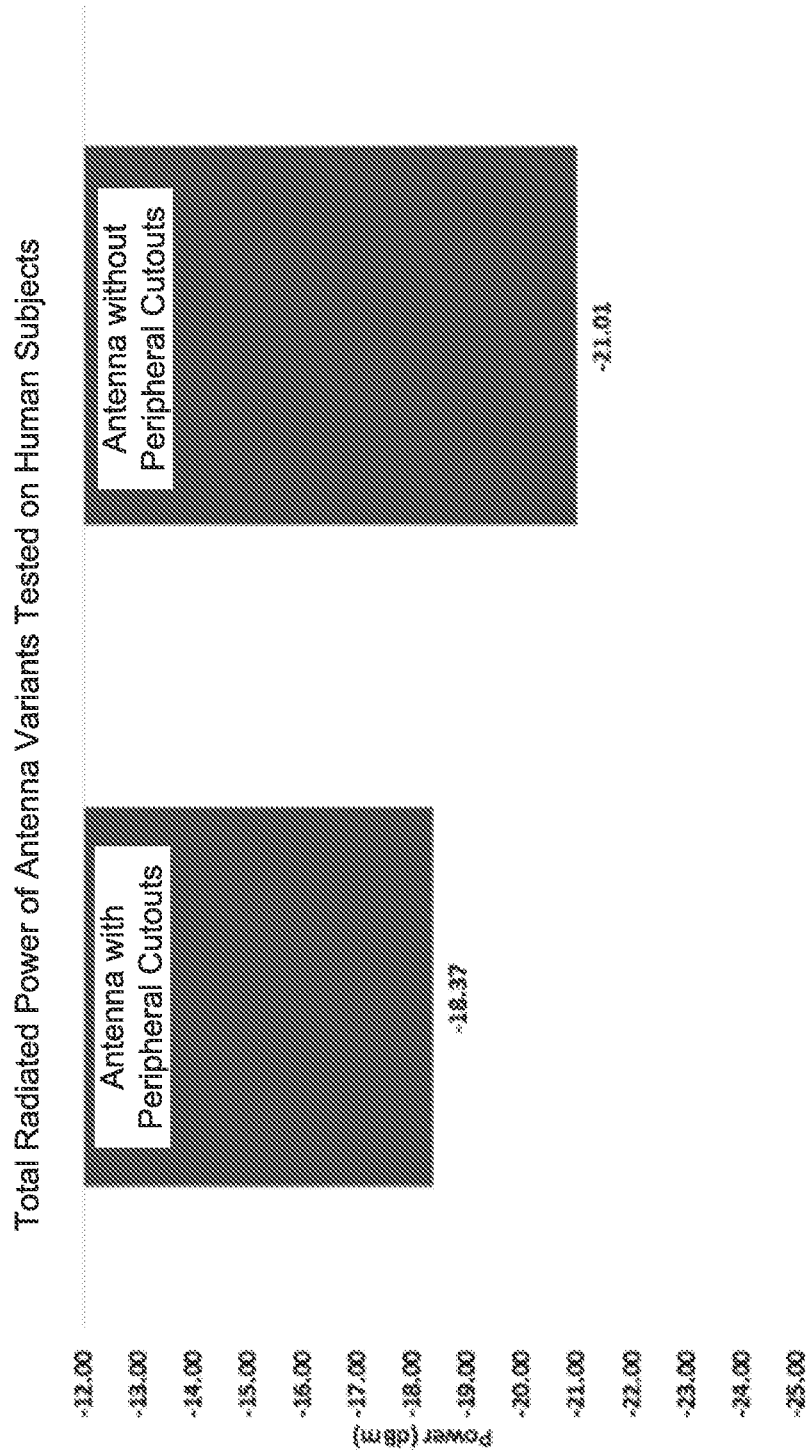
FIG. 10 is a graph showing an improvement in radiation efficiency for a hearing device equipped with an antenna comprising peripheral cutouts in comparison to a hearing device equipped with an antenna devoid of peripheral cutouts.

Experiments were performed using hearing devices (e.g., RIC devices) with bowtie antennas having a configuration similar to that of antenna 400 shown in FIG. 4. A hearing device with an antenna comprising peripheral cutouts was placed on the left side of a human wearer's head, and total radiated power (TRP) was measured for this antenna configuration. A hearing device with the antenna devoid of peripheral cutouts was placed on the left side of the human wearer's head, and TRP was measured for this antenna configuration. This testing was repeated for two human subjects. FIG. 10 shows the averaged TRP results comparison of the two antenna variants before factoring out mismatch losses. Both antenna variants were impedance matched between a 100 ohm (nominal) differential output of a SAW (surface acoustic wave) filter and the antenna feed, it being understood that other pre-select filters can be used (e.g., a bulk acoustic wave (BAW) filter). As can be seen in FIG. 10, there is approximately a 2-4 dB improvement in radiation efficiency for the hearing device with the antenna incorporating peripheral cutouts. It is understood that this testing procedure could have been performed on the right side of the wearer's head, and would have resulted in a similar improvement in radiation efficiency for the right hearing device with the antenna incorporating peripheral cutouts.

This document discloses numerous embodiments, including but not limited to the following:

Item 1 is an ear-worn electronic hearing device configured to be worn by a wearer, comprising:
    an enclosure configured to be supported by, at, in or on an ear of the wearer;
    electronic circuitry disposed in the enclosure and comprising a wireless transceiver; and
    an antenna disposed in or on the enclosure and operably coupled to the wireless transceiver, the antenna having a physical size and comprising a plurality of cutouts disposed along a periphery of the antenna, the cutouts configured to increase an electrical length of the antenna without an increase in the physical size of the antenna.

Item 2 is the device of item 1, wherein:
    the antenna comprises an antenna element disposed on a substrate comprising electrically insulating material; and
    each of the cutouts defines a void in the electrically conductive material with the substrate extending across the void.

Item 3 is the device of item 1, wherein the cutouts are configured to increase a length of a path of current distribution along the periphery of the antenna.

Item 4 is the device of item 1, wherein:
    the cutouts reduce a surface area of the antenna relative to the antenna devoid of the cutouts; and
    the cutouts are configured to increase a radiation efficiency of the antenna notwithstanding the reduction in antenna surface area.

Item 5 is the device of item 1, wherein the cutouts are configured to increase an impedance bandwidth of the antenna relative to the antenna devoid of the cutouts.

Item 6 is the device of item 1, wherein the cutouts are configured to modify one or both of an impedance and a resonance frequency of the antenna.

Item 7 is the device of item 1, wherein:

the cutouts are arranged as a plurality of cutout groups each comprising a repeating pattern of cutouts; and two or more of the cutout groups are disposed along different sections of the antenna periphery.

Item 8 is the device of item 1, wherein at least some of the cutouts have a polygonal shape.

Item 9 is the device of item 1, wherein at least some of the cutouts have a generally curved or curvilinear shape.

Item 10 is the device of item 1, wherein at least some of the cutouts have a hammer shape, a star shape, a sawtooth shape, a round shape, an oval shape, an elliptical shape, a lollipop shape, or a combination of any of these shapes.

Item 11 is the device of item 1, wherein the antenna comprises:

at least one interior window having a window periphery; and a plurality of window cutouts disposed along the window periphery, the window cutouts configured to increase a path length of current distribution along the window periphery.

Item 12 is the device of item 11, wherein at least some of the window cutouts have a polygonal shape, a generally curved or curvilinear shape, or a combination of any of these shapes.

Item 13 is an ear-worn electronic hearing device configured to be worn by a wearer, comprising:

an enclosure configured to be supported by, at, in or on an ear of the wearer;

electronic circuitry disposed in the enclosure and comprising a wireless transceiver; and an antenna disposed in or on the enclosure and operably coupled to the wireless transceiver, the antenna having a physical size and comprising:

two antenna elements each comprising electrically conductive material and oriented substantially in opposition to one another, at least some of the electronic circuitry disposed between the two antenna elements;

at least one strap connected to and between the two antenna elements; and a plurality of cutouts disposed along a periphery of the two antenna elements, the cutouts configured to increase an electrical length of the antenna without an increase in the physical size of the antenna.

Item 14 is the device of item 13, wherein:

each of the two antenna elements is disposed on a substrate comprising electrically insulating material; and each of the cutouts defines a void in the electrically conductive material with the substrate extending across the void.

Item 15 is the device of item 13, wherein the cutouts are configured to increase a length of a path of current distribution along the periphery of the two antenna elements.

Item 16 is the device of item 13, wherein:

the cutouts reduce a surface area of the two antenna elements relative to the two antenna elements devoid of the cutouts; and the cutouts are configured to increase a radiation efficiency of the antenna notwithstanding the reduction in surface area of the two antenna elements.

Item 17 is the device of item 13, wherein the cutouts are configured to increase an impedance bandwidth of the antenna relative to the antenna devoid of the cutouts.

Item 18 is the device of item 13, wherein the cutouts are configured to modify one or both of an impedance and a resonance frequency of the antenna.

Item 19 is the device of item 13, wherein:

the cutouts are arranged as a plurality of cutout groups each comprising a repeating pattern of cutouts; and two or more of the cutout groups are disposed along different sections of the periphery of each of the two antenna elements.

Item 20 is the device of item 13, wherein at least some of the cutouts have a polygonal shape.

Item 21 is the device of item 13, wherein at least some of the cutouts have a generally curved or curvilinear shape.

Item 22 is the device of item 13, wherein one or both of the two antenna elements comprises:

at least one interior window having a window periphery; and a plurality of window cutouts disposed along the window periphery, the window cutouts configured to increase a path length of current distribution along the window periphery.

Item 23 is the device of item 22, wherein at least some of the window cutouts have a polygonal shape, a generally curved or curvilinear shape, or a combination of any of these shapes.

Item 24 is an ear-worn electronic hearing device configured to be worn by a wearer, comprising:

an enclosure configured to be supported by, at, in or on an ear of the wearer;

electronic circuitry disposed in the enclosure and comprising a wireless transceiver; and an antenna disposed in or on the enclosure and operably coupled to the wireless transceiver, the antenna having a physical size and comprising:

at least one interior window having a window periphery; and a plurality of window cutouts disposed along the window periphery, the window cutouts configured to increase a path length of current distribution along the window periphery and increase an electrical length of the antenna without an increase in the physical size of the antenna.

Item 25 is the device of item 24, wherein:

the antenna comprises two antenna elements each comprising electrically conductive material and oriented substantially in opposition to one another, at least some of the electronic circuitry disposed between the two antenna elements;

at least one strap is connected to and between the two antenna elements; and each of the two antenna elements comprises at least one of the interior windows.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electromagnetic signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of," "consisting of" and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

What is claimed is:

1. An ear-worn electronic hearing device configured to be worn by a wearer, comprising:
    an enclosure configured to be supported by, at, in or on an ear of the wearer;
    electronic circuitry disposed in the enclosure and comprising a wireless transceiver; and
    an antenna disposed in or on the enclosure and operably coupled to the wireless transceiver, the antenna having a physical size and defining a plurality of cutouts disposed along a first edge of the antenna, wherein each cutout in the plurality of cutouts extends in a height or length direction less than half of a physical distance from the first edge of the antenna to a second edge of the antenna opposite the first edge of the antenna.

2. The ear-worn electronic hearing device of claim 1, wherein the cutouts are configured to increase an electrical length of the antenna without an increase in the physical size of the antenna relative to the antenna devoid of the cutouts.

3. The ear-worn electronic hearing device of claim 1, wherein at least one of the first edge or the second edge is an internal edge of the antenna.

4. The ear-worn electronic hearing device of claim 1, wherein at least one of the first edge or the second edge is an external edge of the antenna.

5. The ear-worn electronic hearing device of claim 1, wherein the plurality of cutouts is a first plurality of cutouts, and the antenna defines a second plurality of cutouts disposed along the second edge, wherein each cutout in the second plurality of cutouts extends in a height or length direction less than half of the physical distance from the second edge to the first edge.

6. The ear-worn electronic hearing device of claim 1, wherein the plurality of cutouts is a first plurality of cutouts, the first plurality of cutouts extends in a height direction, and the antenna defines a second plurality of cutouts disposed along a third edge of the antenna, wherein each cutout in the third plurality of cutouts extends in the width direction less than half a physical distance from the third edge to a fourth edge of the antenna opposite the third edge of the antenna.

7. The ear-worn electronic hearing device of claim 1, wherein:
    the antenna comprises an antenna element disposed on a substrate comprising electrically insulating material; and
    each of the cutouts defines a void in an electrically conductive material with the substrate extending across the void.

8. The ear-worn electronic hearing device of claim 1, wherein the cutouts are configured to increase a length of a path of current distribution along a periphery of the antenna relative to the antenna devoid of the cutouts.

9. The ear-worn electronic hearing device of claim 1, wherein:
    the cutouts reduce a surface area of the antenna relative to the antenna devoid of the cutouts; and
    the cutouts are configured to increase a radiation efficiency of the antenna relative to the antenna devoid of the cutouts notwithstanding the reduction in the surface area of the antenna.

10. The ear-worn electronic hearing device of claim 1, wherein the cutouts are configured to increase an impedance bandwidth of the antenna relative to the antenna devoid of the cutouts.

11. The ear-worn electronic hearing device of claim 1, wherein the cutouts are configured to modify one or both of an impedance and a resonance frequency of the antenna.

12. The ear-worn electronic hearing device of claim 11, wherein at least some of the window cutouts have a polygonal shape, a generally curved or curvilinear shape, or a combination of any of the polygonal or generally curved or curvilinear shapes.

13. The ear-worn electronic hearing device of claim 1, wherein the cutouts include cutouts having a polygonal shape.

14. The ear-worn electronic hearing device of claim 1, wherein the cutouts include cutouts having a generally curved or curvilinear shape.

15. The ear-worn electronic hearing device of claim 1, wherein the cutouts include cutouts having a hammer shape, a star shape, a sawtooth shape, a round shape, an oval shape, an elliptical shape, or a lollipop shape.

16. The ear-worn electronic hearing device of claim 1, wherein the antenna further defines:
- at least one interior window having a window periphery; and
- a plurality of window cutouts disposed along the window periphery, the window cutouts configured to increase a path length of current distribution along the window periphery relative to the antenna devoid of the window cutouts.

17. The ear-worn electronic hearing device of claim 1, wherein, for each cutout of the plurality of cutouts, a depth of the cutout is less than 25% of a distance from an outer opening of the cutout to an edge of the antenna opposite the cutout.

\* \* \* \* \*